United States Patent
Toda

(10) Patent No.: US 9,252,700 B2
(45) Date of Patent: Feb. 2, 2016

(54) MOTOR CONTROLLER

(71) Applicant: SANYO DENKI CO., LTD., Tokyo (JP)

(72) Inventor: Takahisa Toda, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 21 days.

(21) Appl. No.: 13/924,195

(22) Filed: Jun. 21, 2013

(65) Prior Publication Data

US 2014/0001998 A1    Jan. 2, 2014

(30) Foreign Application Priority Data

Jun. 29, 2012   (JP) ................. 2012-147103

(51) Int. Cl.
| | | |
|---|---|---|
| H02P 25/08 | (2006.01) | |
| H01F 37/00 | (2006.01) | |
| H02P 29/00 | (2006.01) | |
| H02P 6/06 | (2006.01) | |

(52) U.S. Cl.
CPC . *H02P 29/00* (2013.01); *H02P 6/06* (2013.01)

(58) Field of Classification Search
None
See application file for complete search history.

(56) References Cited

U.S. PATENT DOCUMENTS

| | | | | |
|---|---|---|---|---|
| 5,532,567 A | * | 7/1996 | Iwasaki ............... | H02P 25/082 318/400.13 |
| 5,589,752 A | * | 12/1996 | Iwasaki et al. ............... | 318/701 |
| 5,697,634 A | * | 12/1997 | Kamimae et al. ......... | 280/124.108 |
| 6,222,336 B1 | * | 4/2001 | McKenzie .............. | G11B 19/04 318/448 |
| 2004/0090196 A1 | * | 5/2004 | Maslov et al. ................ | 318/272 |
| 2010/0271700 A1 | * | 10/2010 | Tokoro et al. ................. | 359/554 |
| 2011/0109155 A1 | | 5/2011 | Anwar et al. | |
| 2012/0074887 A1 | * | 3/2012 | Yan et al. ................. | 318/400.34 |

FOREIGN PATENT DOCUMENTS

| | | |
|---|---|---|
| JP | 04-340391 A | 11/1992 |
| JP | 5-95063 A | 4/1993 |
| JP | 06-153557 A | 5/1994 |
| JP | 2001-186787 A | 7/2001 |

OTHER PUBLICATIONS

Notice of Reason for Refusal for Japanese Patent Application No. 2012-147103 mailed on Nov. 10, 2015.

* cited by examiner

*Primary Examiner* — Eduardo Colon Santana
*Assistant Examiner* — Cortez Cook
(74) *Attorney, Agent, or Firm* — Novak Druce Connolly Bove + Quigg LLP

(57) ABSTRACT

A motor controller that controls energization of a motor in which a plurality of coils U1 to W2 that applies torque to a rotor is arranged in a circular pattern includes: a rotation speed detection sensor that detects a rotation speed of the motor; and an energization control unit that controls energization of the plurality of coils U1 to W2 using the detected rotation speed. The energization control unit sequentially energizes the plurality of coils U1 to W2 in all energization patterns if the detected rotation speed is outside of predetermined conditions and sequentially energizes the plurality of coils U1 to W2 in remaining energization patterns (for example, U→V phase, V→W phase, V→U phase, W→U phase, and W→V phase) excluding a partial energization pattern (for example, U→W phase) of all energization patterns if the detected rotation speed is within the predetermined conditions.

9 Claims, 8 Drawing Sheets

MOTOR CONTROLLER

CROSS-REFERENCE TO RELATED APPLICATION

This application claims priority to Japanese Application No. 2012-147103, filed Jun. 29, 2012, the entirety of which is incorporated herein by reference.

BACKGROUND

1. Field of the Invention

The present invention relates to a motor controller capable of suppressing resonant vibration (in this specification, vibration resulting from resonance phenomenon will be referred to as resonant vibration) occurring in a motor at a specific rotation speed.

2. Description of the Related Art

In order to cool down a computer, a cooling fan that takes in the ambient air into a casing is attached to the casing that accommodates the computer such as a CPU.

As an example of cooling fans, JP 5-95063 A discloses a variable speed cooling fan that changes a rotation speed according to the temperature of the casing.

However, in the variable speed cooling fan, a switching frequency of current supplied to a motor coil and a mechanical resonance frequency of the motor influence each other in a specific rotation speed region. As a result, the motor itself oscillates and vibration occurs, which may increase the noise of the cooling fan.

SUMMARY

The invention has been made to solve the above problem, and an object of the invention is to provide a motor controller capable of suppressing resonant vibration occurring in a motor at a specific rotation speed.

In order to attain the object, the invention provides a motor controller that controls energization of a motor in which a plurality of coils that applies torque to a rotor is arranged in a circular pattern. The motor controller includes a rotation speed detection sensor and an energization control unit.

The rotation speed detection sensor detects a rotation speed of the motor. The energization control unit controls energization of the plurality of coils using the detected rotation speed. Specifically, the energization control unit sequentially energizes the plurality of coils in all energization patterns if the detected rotation speed is outside of predetermined conditions, and sequentially energizes the plurality of coils in remaining energization patterns excluding a partial energization pattern of all energization patterns if the detected rotation speed is within the predetermined conditions.

In order to attain the object, the invention further provides a motor controller that controls energization of a motor in response to a signal associated with resonant vibration of the motor itself and a device to which the motor is attached. The motor has a plurality of coils that applies torque to a rotor and is arranged in a circular pattern. The motor controller includes an energization control unit.

The energization control unit sequentially energizes the plurality of coils in all energization patterns unless a vibration level corresponding to the signal associated with the resonant vibration exceeds a predetermined vibration level, and sequentially energizes the plurality of coils in remaining energization patterns excluding a partial energization pattern of all energization patterns if the vibration level corresponding to the signal associated with the resonant vibration exceeds the predetermined vibration level.

In the motor controller according to the invention, the plurality of coils is sequentially energized in remaining energization patterns at a rotation speed, at which resonant vibration occurs, excluding a partial energization pattern of all energization patterns. Thus, it is possible to suppress resonant vibration occurring in the motor at a specific rotation speed and to reduce noise.

DETAILED DESCRIPTION

Hereinafter, first to third embodiments of a motor controller according to the invention will be described with reference to the accompanying drawings.

A motor controller according to the first embodiment illustrates an aspect in which, when a rotation speed of a rotor is a specific rotation speed or lower, a plurality of coils is sequentially energized with remaining energization patterns excluding a partial energization pattern of all energization patterns.

A motor controller according to the second embodiment illustrates an aspect in which, when a rotation speed of a rotor is between a predetermined lower limit rotation speed and a predetermined upper limit rotation speed, a plurality of coils is sequentially energized with remaining energization patterns excluding a partial energization pattern of all energization patterns.

A motor controller according to the third embodiment illustrates an aspect in which, when resonant vibration occurring in a motor exceeds a predetermined vibration level, a plurality of coils is sequentially energized with remaining energization patterns excluding a partial energization pattern of all energization patterns.

[First Embodiment]
(Configuration of Motor Controller)

Figure 1:
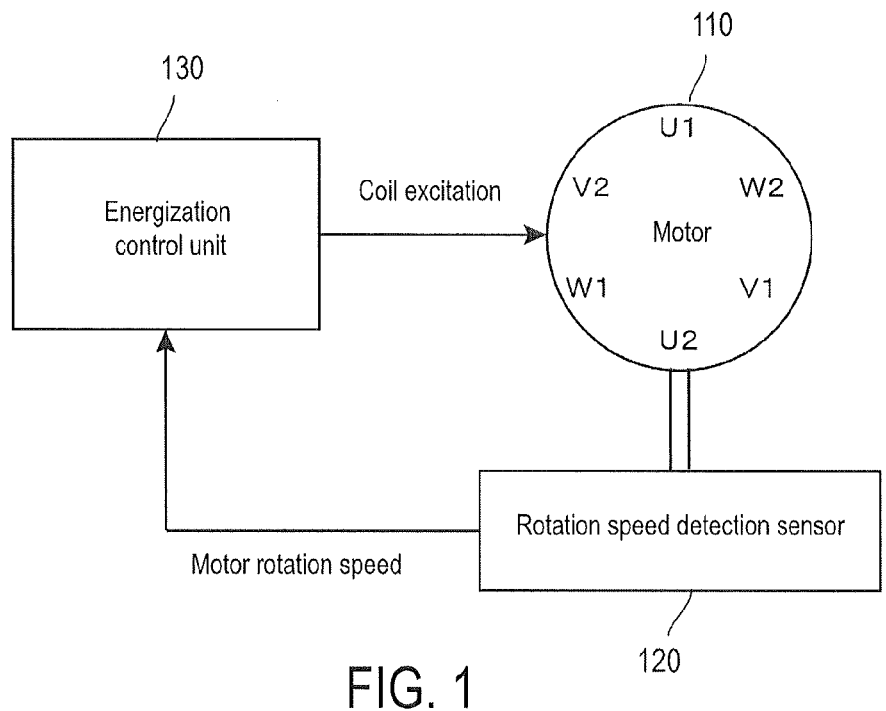
FIG. 1 is a block diagram of a motor controller according to a first embodiment.

FIG. 1 is a block diagram of a motor controller according to the first embodiment.

A motor controller 100 according to the present embodiment controls energization of a motor 110. The motor 110 is a 3-phase, 6-slot, and 4-pole motor, in which a plurality of coils U1, V1, W1, U2, V2, and W2 that applies torque to a 4-pole rotor (not illustrated) is arranged in a circular pattern.

The motor 110 has a rotation speed detection sensor 120 that detects a rotation speed of the rotor of the motor 110. An optional sensor selected from a hall sensor, an encoder, and a resolver that can detect a rotational position of the rotor can be used as the rotation speed detection sensor 120.

The motor controller 100 according to the first embodiment includes the rotation speed detection sensor 120 and an energization control unit 130.

The energization control unit 130 controls energization patterns for exciting the respective coils U1 to W2 of the U, V, and W phases using the rotor rotation speed detected by the rotation speed detection sensor 120.

Specifically, since resonant vibration does not occur if the rotor rotation speed detected by the rotation speed detection sensor 120 is outside of predetermined conditions (rotation speeds at which resonant vibration occurs in the motor 110), the energization control unit 130 sequentially energizes the respective coils of the U, V, and W phases with all energization patterns.

For example, the respective coils are sequentially energized with energization patterns of U→V phase, U→W phase, V→W phase, V→U phase, W→U phase, and W→V phase so that the U, V, and W phases are excited. The rotor rotation speed changes according to a rotation speed of a rotating magnetic field formed by the U, V, and W phases.

On the other hand, if the rotor rotation speed detected by the rotation speed detection sensor 120 is within predetermined conditions (rotation speeds at which resonant vibration occurs in the motor 110), in order to suppress occurrence of resonant vibration, the energization control unit 130 sequentially energizes the respective coils of the U, V, and W phases with remaining energization patterns excluding a partial energization pattern (for example, U→W phase) of all energization patterns.

For example, the respective coils are sequentially energized with energization patterns of U→V phase, V→W phase, V→U phase, W→U phase, and W→V phase so that the U, V, and W phases are excited. Since the rotor rotation speed changes according to a rotation speed of a rotating magnetic field formed by the U, V, and W phases, the rotation speed does not change even if energization of U→W phase which is a partial energization pattern is stopped. However, since the coils are not excited in the partial energization pattern, it is possible to suppress the occurrence of resonant vibration of the motor 110 in a specific rotation speed.

Figure 2:
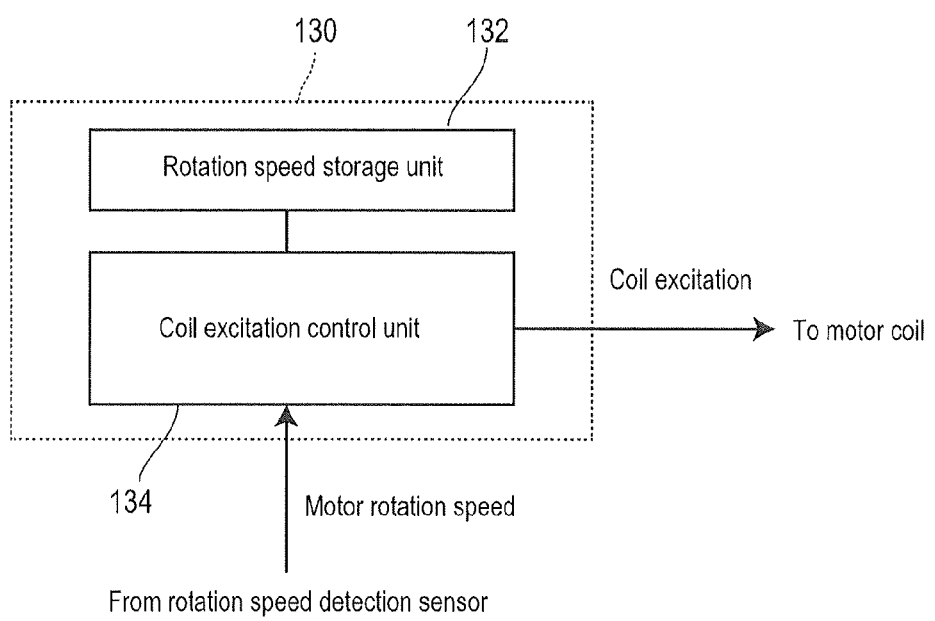
FIG. 2 is a block diagram of an energization control unit according to the first embodiment.

FIG. 2 is a block diagram of the energization control unit 130 according to the first embodiment.

The energization control unit 130 includes a rotation speed storage unit 132 and a coil excitation control unit 134.

The rotation speed storage unit 132 stores predetermined conditions. In the present embodiment, the predetermined conditions are the rotor rotation speeds that are equal to or lower than a specific rotation speed. That is, the rotation speed storage unit 132 stores rotation speeds lower than a rotation speeds in which there is a possibility that resonant vibration occurs in the motor 110. In the present embodiment, two rotation speeds of 3600 rpm and 4700 rpm are stored.

The coil excitation control unit 134 controls energization of the coils of the U, V, and W phases based on whether the rotor rotation speed detected by the rotation speed detection sensor 120 is faster or slower than the rotation speed stored in the rotation speed storage unit 132. Specifically, since resonant vibration does not occur if the rotation speed detected by the rotation speed detection sensor 120 is faster than the rotation speed stored in the rotation speed storage unit 132, the respective coils are energized in the order of U→V phase, U→W phase, V→W phase, V→U phase, W→U phase, and W→V phase. On the other hand, since there is a possibility that resonant vibration occurs if the detected rotation speed is slower than the stored rotation speed, the respective coils are energized in the order of U→V phase, V→W phase, V→U phase, W→U phase, and W→V phase.

(Operation of Motor Controller)

Figure 3:
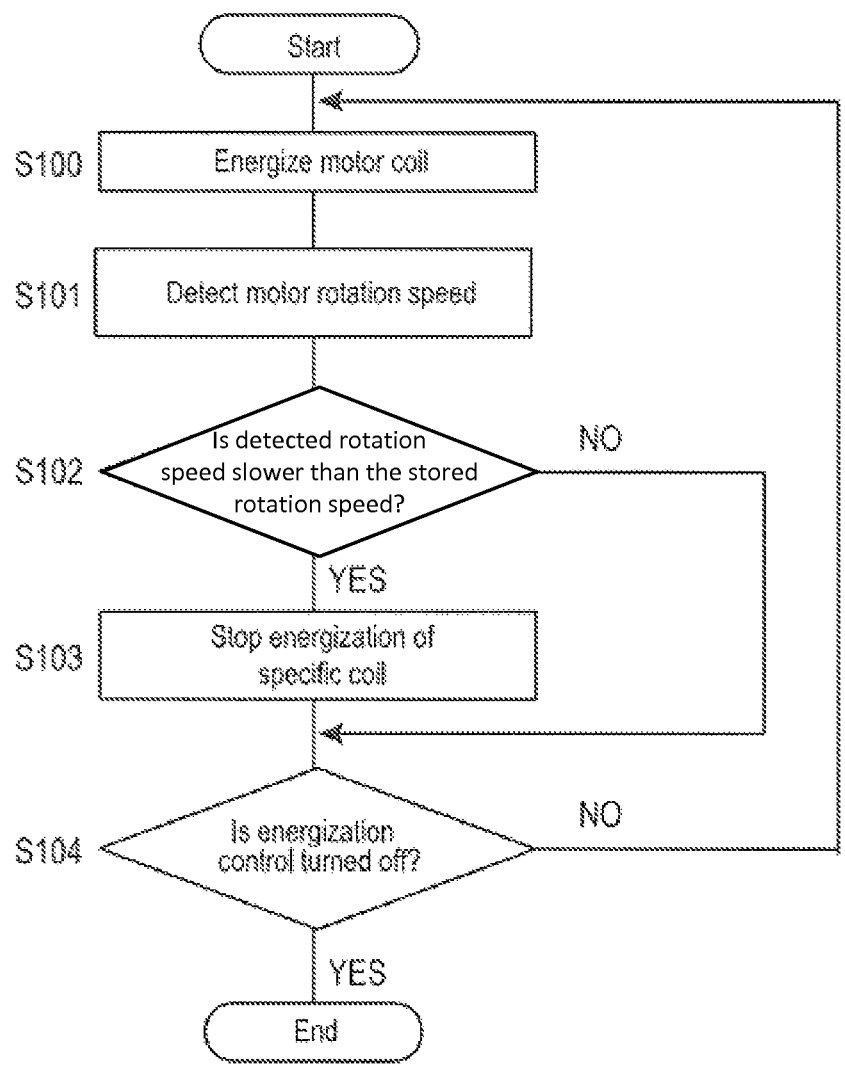
FIG. 3 is an operation flowchart of the motor controller according to the first embodiment.
Figure 4A:
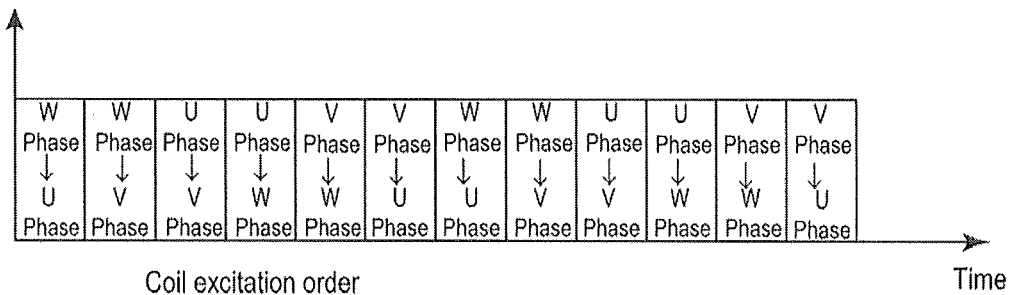
FIG. 4A is a diagram provided for describing the operation of the motor controller according to the first embodiment.
Figure 4B:
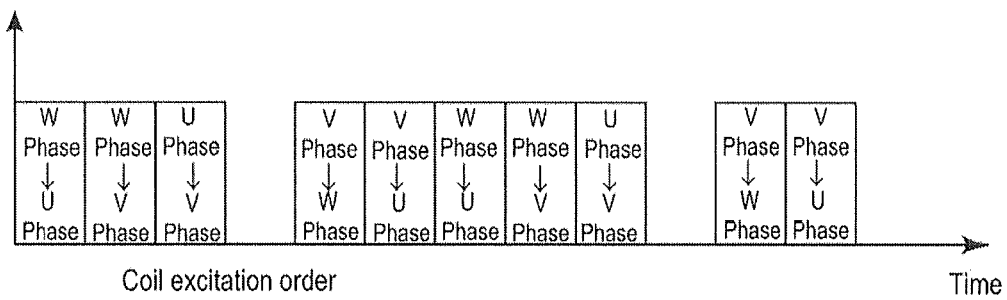
FIG. 4B is a diagram provided for describing the operation of the motor controller according to the first embodiment.
Figure 4C:
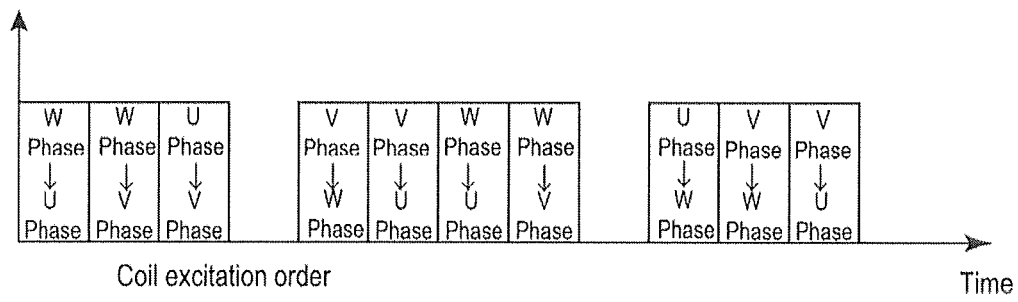
FIG. 4C is a diagram provided for describing the operation of the motor controller according to the first embodiment.

FIG. 3 is an operation flowchart of the motor controller according to the first embodiment, and FIGS. 4A to 4C are diagrams provided for describing the operation of the motor controller according to the first embodiment.

Next, the operation of the motor controller 100 according to the present embodiment will be described with reference to FIGS. 3 and 4A to 4C.

First, when energization control starts, the energization control unit 130 starts energizing all coils of the U, V, and W phases of the motor 110. Specifically, the coil excitation control unit 134 excites the U, V, and W phases in the order of the predetermined energization patterns.

More specifically, the coil excitation control unit 134 supplies current to the respective coils in the order of the energization patterns of U→V phase, U→W phase, V→W phase, V→U phase, W→U phase, and W→V phase (S100).

Subsequently, the rotation speed detection sensor 120 detects the rotation speed of the motor 110. The coil excitation control unit 134 receives the rotation speed detected by the rotation speed detection sensor 120 and compares the detected rotation speed with the rotation speed stored in the rotation speed storage unit 132 (S101).

When the comparison result between the detected rotation speed and the stored rotation speed shows that the detected rotation speed is slower than the stored rotation speed (YES in S102), the coil excitation control unit 134 stops energization in a specific energization pattern. For example, as illustrated in FIG. 4B, the respective coils are sequentially energized in the remaining energization patterns excluding a partial energization pattern (for example, U→W phase) of all energization patterns. When the U→W phase energization which is the partial energization pattern is stopped, energization of the respective coils in the order of the energization patterns of U→V phase, V→W phase, V→U phase, W→U phase, and W→V phase is repeated, and resonant vibration occurring in the motor 110 is suppressed. In the above example, a case where energization in the U→W phase energization pattern as the partial energization pattern is stopped has been described. However, as illustrated in FIG. 4C, the excluded energization pattern may be selected randomly in such a manner that energization in the U→V phase energization pattern is stopped in certain rotation, and energization in the V→U phase energization pattern is stopped in the next rotation (S103).

On the other hand, when the comparison result between the detected rotation speed and the stored rotation speed shows that the detected rotation speed is faster than the stored rotation speed (NO in S102), the flow returns to step S100, and the coil excitation control unit 134 excites all of the U, V, and W phases in a predetermined order as illustrated in FIG. 4A.

When the energization control unit 130 outputs an energization OFF command (YES in S104), the coil excitation control unit 134 stops excitation of all phases (U, V, and W phases) and stops the motor 110. On the other hand, when the energization OFF command is not output (NO in S104), the processes of S100 to S104 are repeated, and the motor 110 rotates continuously.

(Effects of Motor Controller)

Figure 5:
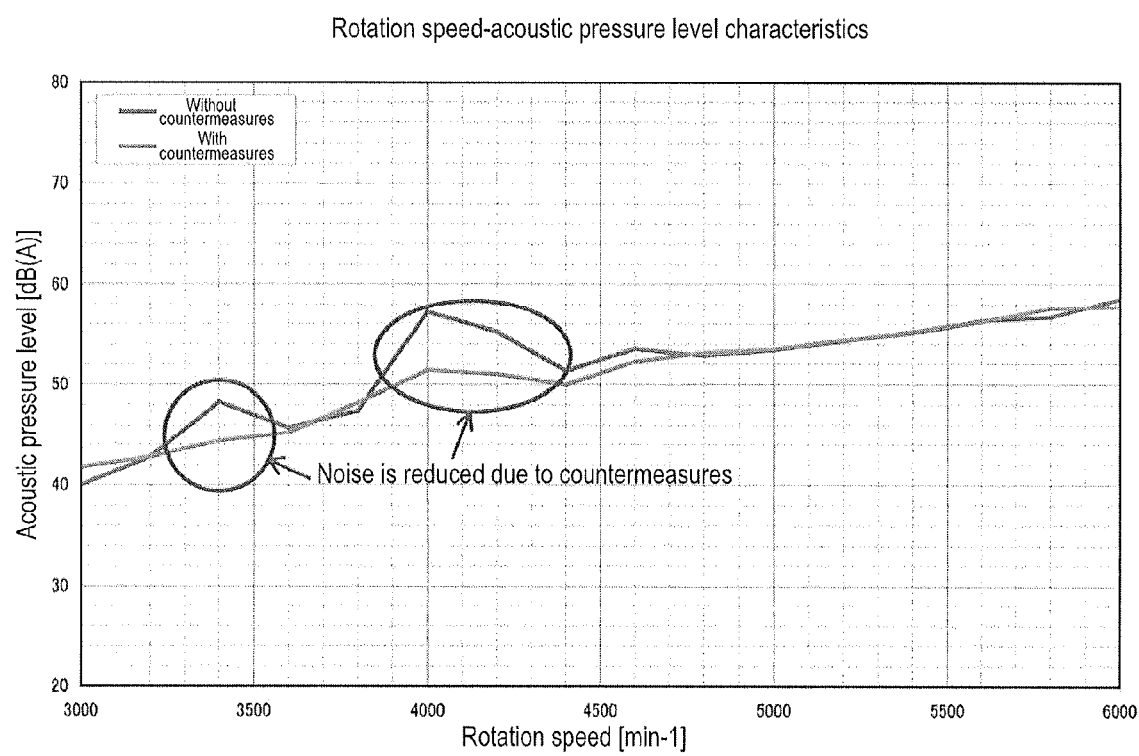
FIG. 5 is a diagram provided for describing the effects of the motor controller according to the first embodiment.

FIG. 5 is a diagram provided for describing the effects of the motor controller according to the first to third embodiments.

As illustrated in FIG. 5, it can be understood that noise resulting from resonant vibration (without countermeasures) that occurred at rotation speeds around 3400 rpm and around 4000 rpm is reduced by 5 dB or more in the motor controller (with countermeasures) according to the present embodiment.

In the motor 110 of the present embodiment used for the above measurement, since it is known that resonant vibration occurs at rotation speeds around 3400 rpm and around 4000 rpm, two rotation speeds of 3600 rpm and 4700 rpm are stored in the rotation speed storage unit 132 as the predetermined conditions.

As described above, in the motor controller 100 according to the first embodiment, a plurality of coils is excited in remaining energization patterns at a rotation speed of a predetermined specific rotation speed or lower, excluding a partial energization pattern rather than all energization patterns. Thus, it is possible to suppress resonant vibration occurring at a specific rotation speed and to reduce motor noise.

[Second Embodiment]
(Configuration of Motor Controller)

The motor controller according to the second embodiment has approximately the same configuration as the motor controller 100 according to the first embodiment. However, the energization control unit according to the present embodiment has a different configuration from the configuration of the energization control unit 130 according to the first embodiment, which will be described below.

Figure 6:
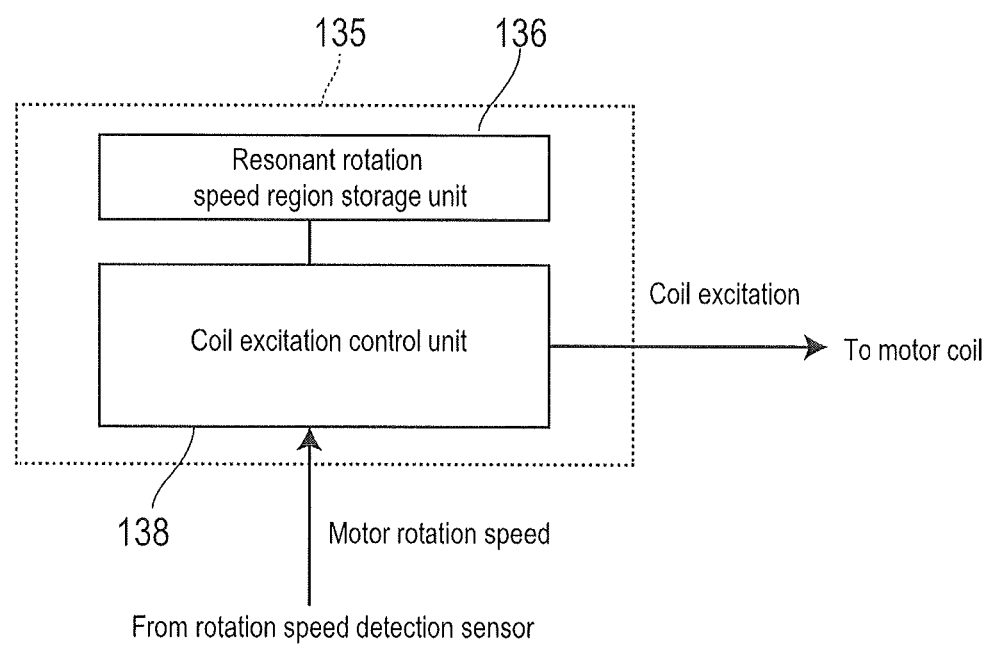
FIG. 6 is a block diagram of an energization control unit according to a second embodiment.

FIG. 6 is a block diagram of an energization control unit 135 according to the second embodiment.

The energization control unit 135 includes a resonant rotation speed region storage unit 136 and a coil excitation control unit 138.

The resonant rotation speed region storage unit 136 stores predetermined conditions. In the present embodiment, the predetermined conditions are rotation speeds between a predetermined lower limit rotor rotation speed and a predetermined upper limit rotor rotation speed. That is, the resonant rotation speed region storage unit 136 stores a rotation speed region in which there is a possibility that resonant vibration occurs in the motor 110. In the present embodiment, 3200 rpm and 4700 rpm are stored as a lower limit rotation speed and an upper limit rotation speed, respectively.

The coil excitation control unit 138 controls energization of the coils of the U, V, and W phases based on whether the rotor rotation speed detected by the rotation speed detection sensor 120 is between the lower limit rotation speed and the upper limit rotation speed stored in the resonant rotation speed region storage unit 136. Specifically, since resonant vibration does not occur if the rotation speed detected by the rotation speed detection sensor 120 is outside of a rotation speed range between the lower limit rotation speed and the upper limit rotation speed stored in the resonant rotation speed region storage unit 136, the respective coils are energized in the order of U→V phase, U→W phase, V→W phase, V→U phase, W→U phase, and W→V phase. On the other hand, since there is a possibility that resonant vibration occurs if the detected rotation speed is within the rotation speed range, the respective coils are energized in the order of U→V phase, V→W phase, V→U phase, W→U phase, and W→V phase.

(Operation of Motor Controller)

Figure 7:
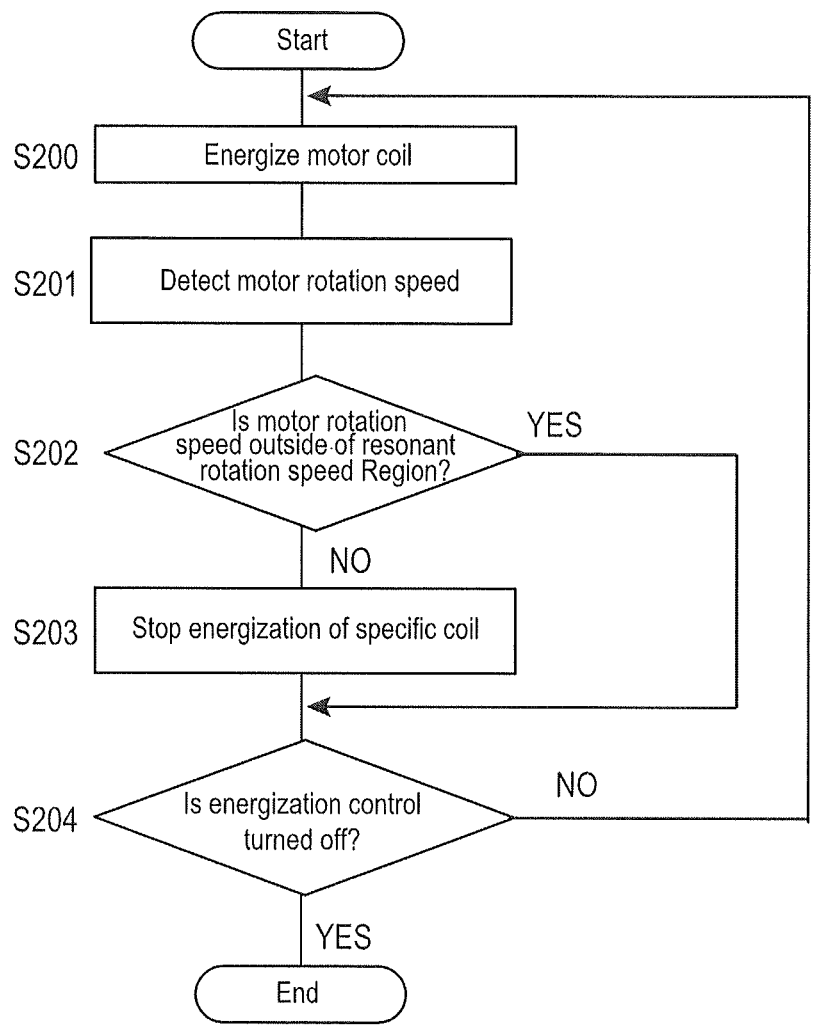
FIG. 7 is an operation flowchart of the motor controller according to the second embodiment.

FIG. 7 is an operation flowchart of the motor controller according to the second embodiment. The operation of the motor controller according to the present embodiment will be described with reference to FIG. 7.

First, when energization control starts, the energization control unit 130 starts energizing all coils of the U, V, and W phases of the motor 110. Specifically, the coil excitation control unit 138 excites the U, V, and W phases in the order of the predetermined energization patterns.

More specifically, the coil excitation control unit 138 supplies current to the respective coils in the order of the energization patterns of U→V phase, U→W phase, V→W phase, V→U phase, W→U phase, and W→V phase (S200).

Subsequently, the rotation speed detection sensor 120 detects the rotation speed of the motor 110. The coil excitation control unit 138 receives the rotation speed detected by the rotation speed detection sensor 120 and compares the detected rotation speed with the rotation speed stored in the resonant rotation speed region storage unit 136 (S201).

When the comparison result between the detected rotation speed and the stored rotation speed shows that the detected rotation speed is within the rotation speed range between the stored lower limit rotation speed and the upper limit rotation speed (NO in S202), the coil excitation control unit 138 stops energization in a specific energization pattern. For example, as illustrated in FIG. 4B, the respective coils are sequentially energized in the remaining energization patterns excluding a partial energization pattern (for example, U→W phase) of all energization patterns. When the U→W phase energization which is the partial energization pattern is stopped, energization of the respective coils in the order of the energization patterns of U→V phase, V→W phase, V→U phase, W→U phase, and W→V phase is repeated, and resonant vibration occurring in the motor 110 is suppressed. In the above example, a case where energization in the U→W phase energization pattern as the partial energization pattern is stopped has been described. However, as illustrated in FIG. 4C, the excluded energization pattern may be selected randomly in such a manner that energization in the U→V phase energization pattern is stopped in certain rotation, and energization in the V→U phase energization pattern is stopped in the next rotation (S203).

When the comparison result between the detected rotation speed and the stored rotation speed shows that the detected rotation speed is outside of the rotation speed range between the stored lower limit rotation speed and the upper limit rotation speed (YES in S202), the flow returns to step S200, and the coil excitation control unit 138 excites all of the U, V, and W phases in a predetermined order as illustrated in FIG. 4A.

When the energization control unit 130 outputs an energization OFF command (YES in S204), the coil excitation control unit 138 stops excitation of all phases (U, V, and W phases) and stops the motor 110. On the other hand, when the energization OFF command is not output (NO in S204), the processes of S200 to S204 are repeated, and the motor 110 rotates continuously.

(Effects of Motor Controller)

As illustrated in FIG. 5, it can be also understood that noise resulting from resonant vibration (without countermeasures) that occurred at rotation speeds around 3400 rpm and around 4000 rpm is reduced by 5 dB or more in the motor controller (with countermeasures) according to the present embodiment.

In the motor 110 of the present embodiment used for the above measurement, since it is known that resonant vibration occurs at rotation speeds around 3400 rpm and around 4000 rpm, a lower limit rotation speed of 3200 rpm and a upper limit rotation speed of 4700 rpm are stored in the resonant rotation speed region storage unit 136 as the predetermined conditions.

As described above, in the motor controller according to the second embodiment, a plurality of coils is excited in remaining energization patterns at a rotation speed within a predetermined resonant rotation speed region, excluding a partial energization pattern rather than all energization patterns. Thus, it is possible to suppress resonant vibration occurring at a specific rotation speed and to reduce motor noise.

[Third Embodiment]

(Configuration of Motor Controller)

Figure 8:
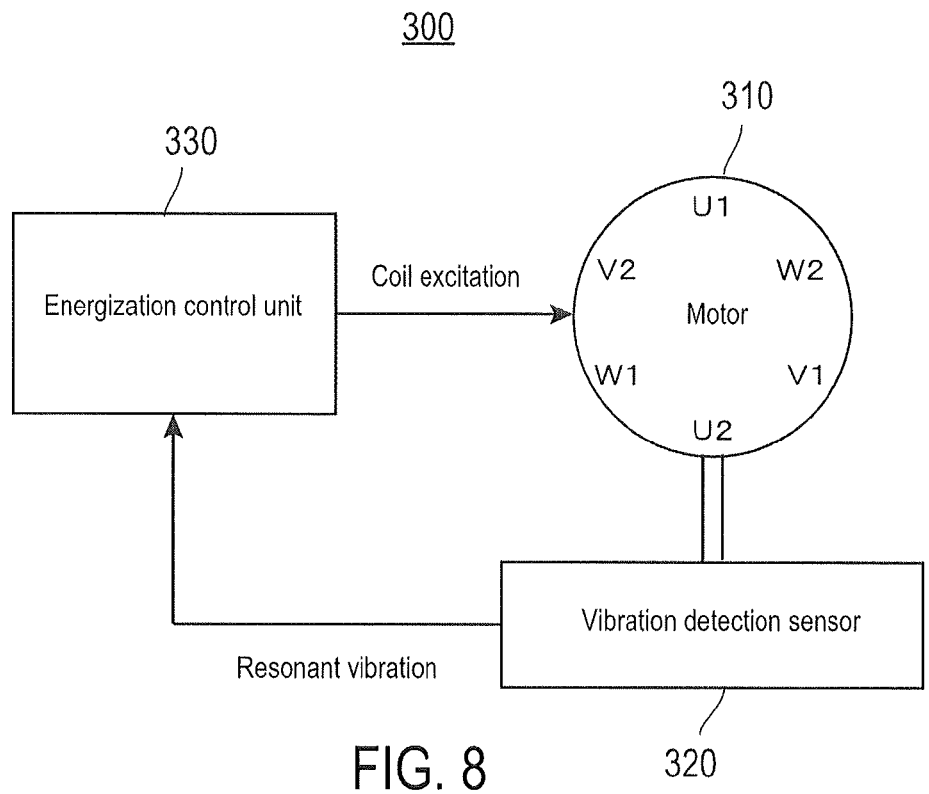
FIG. 8 is a block diagram of a motor controller according to a third embodiment.

FIG. 8 is a block diagram of a motor controller according to the third embodiment.

A motor controller 300 according to the present embodiment controls energization of a motor 310. The motor 310 has the same configuration as that of the first embodiment.

The motor 310 includes a vibration detection sensor 320 that detects resonant vibration of the motor 310 itself and a device to which the motor 310 is attached. The vibration detection sensor 320 may be attached to the motor 310 itself so as to detect resonant vibration of the motor 310 itself as in the present embodiment and may be attached to a device equipped with the motor 310 (for example, the frame of a cooling fan) so as to detect resonant vibration occurring between the motor 310 and the device resulting from vibration of the motor 310. An optional sensor selected from an acceleration sensor, a piezoelectric sensor, and a laser vibration meter that can detect resonant vibration can be used as the vibration detection sensor 320. In the present embodiment, a case where the vibration detection sensor 320 is attached to the motor 310 is illustrated.

The motor controller 300 according to the third embodiment includes the vibration detection sensor 320 and an energization control unit 330.

The energization control unit 330 controls energization patterns for exciting the respective coils U1 to W2 of the U, V, and W phases using a signal associated with vibration of the motor detected by the vibration detection sensor 320.

Specifically, since resonant vibration does not occur unless the vibration of the motor 310 detected by the vibration detection sensor 320 exceeds a predetermined vibration level, the energization control unit 330 sequentially energizes the respective coils of the U, V, and W phases with all energization patterns.

On the other hand, when the vibration of the motor 310 detected by the vibration detection sensor 320 exceeds the predetermined vibration level, in order to suppress occurrence of resonant vibration, the energization control unit 330 sequentially energizes the respective coils of the U, V, and W phases with remaining energization patterns excluding a partial energization pattern (for example, U→W phase) of all energization patterns.

Since the rotor rotation speed changes according to a rotation speed of a rotating magnetic field formed by the U, V, and W phases, the rotation speed does not change even if energization of U→W phase which is a partial energization pattern is stopped. However, since the coils are not excited in the partial energization pattern, it is possible to suppress the occurrence of resonant vibration of the motor 310 in a specific rotation speed.

Figure 9:
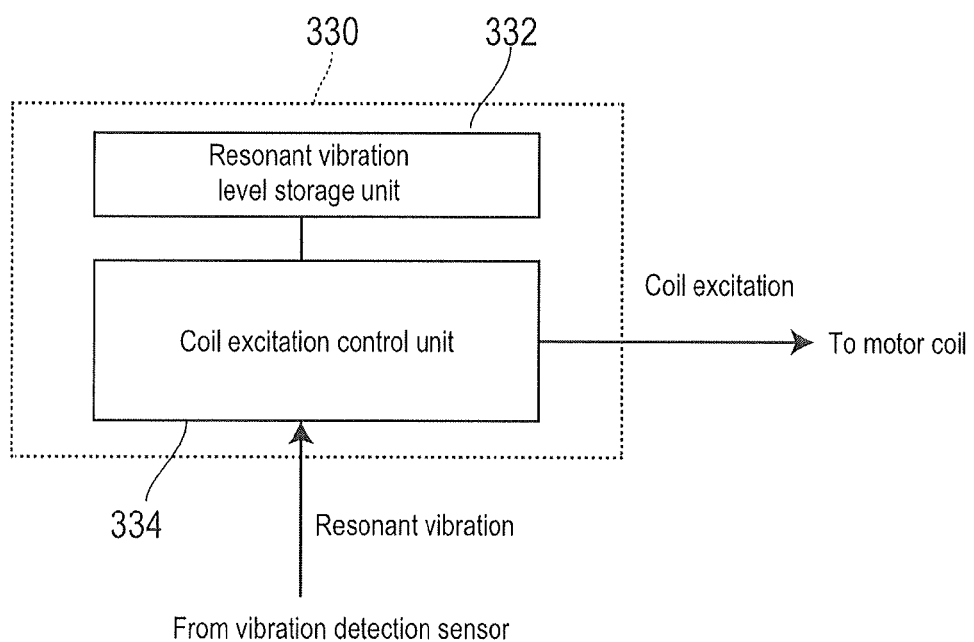
FIG. 9 is a block diagram of an energization control unit according to the third embodiment.

FIG. 9 is a block diagram of the energization control unit 330 according to the third embodiment.

The energization control unit 330 includes a resonant vibration level storage unit 332 and a coil excitation control unit 334.

The resonant vibration level storage unit 332 stores a predetermined vibration level. The vibration level stored in the resonant vibration level storage unit 332 is obtained by experiments.

The coil excitation control unit 334 controls energization of the coils of the U, V, and W phases based on whether the vibration of the motor 310 detected by the vibration detection sensor 320 is smaller or larger than the vibration level stored in the resonant vibration level storage unit 332. Specifically, since resonant vibration does not occur if the vibration level of the motor 310 detected by the vibration detection sensor 320 is smaller than the vibration level stored in the resonant vibration level storage unit 332, the respective coils are energized in the order of U→V phase, U→W phase, V→W phase, V→U phase, W→U phase, and W→V phase. On the other hand, since there is a possibility that resonant vibration occurs if the detected vibration level is larger than the stored vibration level, the respective coils are energized in the order of U→V phase, V→W phase, V→U phase, W→U phase, and W→V phase.

(Operation of Motor Controller)

Figure 10:
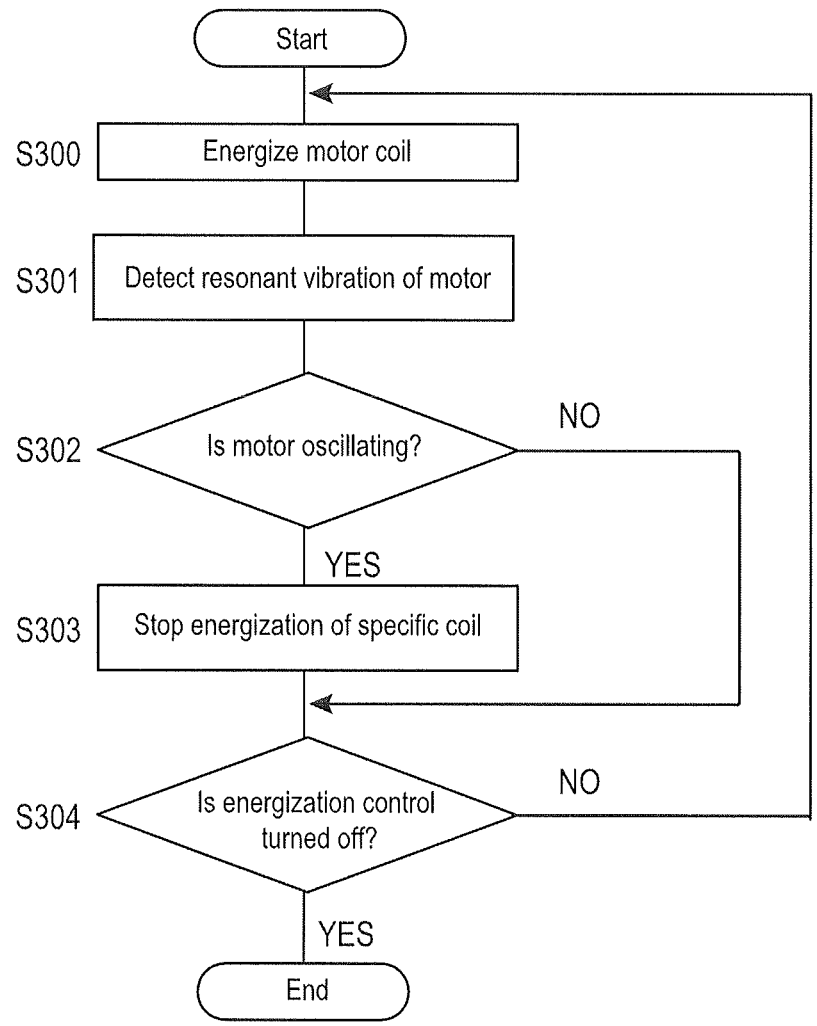
FIG. 10 is an operation flowchart of the motor controller according to the third embodiment.

FIG. 10 is an operation flowchart of the motor controller according to the third embodiment. Next, the operation of the motor controller 300 according to the present embodiment will be described with reference to FIG. 10.

First, when energization control starts, the energization control unit 330 starts energizing all coils of the U, V, and W phases of the motor 310. Specifically, the coil excitation control unit 334 excites the U, V, and W phases in the order of the predetermined energization patterns.

More specifically, the coil excitation control unit 334 supplies current to the respective coils in the order of the energization patterns of U→V phase, U→W phase, V→W phase, V→U phase, W→U phase, and W→V phase (S300).

Subsequently, the vibration detection sensor 320 detects resonant vibration of the motor 310. The coil excitation control unit 334 receives a vibration signal detected by the vibration detection sensor 320 and compares a vibration level corresponding to the vibration signal with the vibration level stored in the resonant vibration level storage unit 332 (S301).

When the comparison result between the detected vibration level and the stored vibration level shows that the detected vibration level is larger than the stored vibration level (YES in S302), the coil excitation control unit 334 stops energization in a specific energization pattern since the motor 310 oscillates and resonant vibration occurs. For example, as illustrated in FIG. 4B, the respective coils are sequentially energized in the remaining energization patterns excluding a partial energization pattern (for example, U→W phase) of all energization patterns. When the U→W phase energization which is the partial energization pattern is stopped, energization of the respective coils in the order of the energization patterns of U→V phase, V→W phase, V→U phase, W→U phase, and W→V phase is repeated, and resonant vibration occurring in the motor 310 is suppressed. In the above example, a case where energization in the U→W phase energization pattern as the partial energization pattern is stopped has been described. However, as illustrated in FIG. 4C, the excluded energization pattern may be selected randomly in such a manner that energization in the U→V phase energization pattern is stopped in certain rotation, and energization in the V→U phase energization pattern is stopped in the next rotation (S303).

On the other hand, when the comparison result between the detected vibration level and the stored vibration level shows that the detected vibration level is smaller than the stored vibration level (NO in S302), the flow returns to step S300, and the coil excitation control unit 334 excites all of the U, V, and W phases in a predetermined order as illustrated in FIG. 4A.

When the energization control unit 330 outputs an energization OFF command (YES in S304), the coil excitation control unit 334 stops excitation of all phases (U, V, and W phases) and stops the motor 310. On the other hand, when the energization OFF command is not output (NO in S304), the processes of S300 to S304 are repeated, and the motor 310 rotates continuously.

(Effects of Motor Controller)

As illustrated in FIG. 5, it can be also understood that noise resulting from resonant vibration (without countermeasures) that occurred at rotation speeds around 3400 rpm and around 4000 rpm is reduced by 5 dB or more in the motor controller (with countermeasures) according to the present embodiment.

In the motor 310 of the present embodiment used for the above measurement, since it is known that resonant vibration occurs at rotation speeds around 3400 rpm and around 4000 rpm, the vibration occurring in the motor 310 at these rotation speeds is measured, and the measured vibration levels are stored in the resonant vibration level storage unit 332.

As described above, in the motor controller 300 according to the third embodiment, when large vibration occurs in the motor 310, a plurality of coils is sequentially excited in remaining energization patterns excluding a partial energization pattern rather than all energization patterns. Thus, it is possible to suppress resonant vibration occurring in the motor 310 and to reduce motor noise.

Although the invention has been described for three embodiments of the first to third embodiment, the motor controller according to the invention can be applied to a single-phase motor or a multi-phase motor such as 2-phase, 3-phase, and 5-phase motors. Moreover, the motor controller according to the invention can be applied to an optional combination of all types of motors having optional numbers of poles and slots.

Further, the motor controller according to the invention is ideal for control of the rotation speed of a server cooling fan that is often used in computer systems, for example. Several tens of cooling fans are often installed in a large-scale computer system, and a noise reduction effect obtained by suppressing resonant vibration is remarkable.

What is clamied is:

1. A motor controller that controls energization of a motor in which a plurality of coils that applies torque to a rotor is arranged in a circular pattern, the motor controller comprising:
   a rotation speed detection sensor that detects a rotation speed of the motor; and
   an energization control unit that controls energization of the plurality of coils using the detected rotation speed;
   wherein the energization control unit is configured to energize the coils as follows:
      when the rotation speed is below a predetermined threshold, partially executing a predetermined pattern of energization steps for sequentially energizing the coils such that some but not all of the energization steps are executed in sequence with at least one energization step in the pattern being omitted, and none of the coils are energized during an omission; and
      when the rotation speed is above the predetermined threshold, fully executing the pattern such that all of the energization steps in the pattern are executed.

2. The motor controller according to claim 1, wherein the energization control unit includes:
   a rotation speed storage unit that stores the predetermined conditions; and
   a coil excitation control unit that controls energization patterns of the plurality of coils using the predetermined conditions.

3. The motor controller according to claim 1, wherein the predetermined conditions are rotation speeds that are equal to or lower than a specific rotation speed.

4. The motor controller according to claim 1, wherein the energization control unit includes:
   a resonant rotation speed region storage unit that stores the predetermined conditions; and
   a coil excitation control unit that controls energization patterns of the plurality of coils using the predetermined conditions.

5. The motor controller according to claim 1, wherein the predetermined conditions are rotation speeds between a predetermined lower limit rotation speed and a predetermined upper limit rotation speed.

6. The motor controller according to claim 1, wherein the rotation speed detection sensor is a hall sensor, an encoder, or a resolver that can detect the rotational position of the rotor.

7. A motor controller that controls energization of a motor in response to a signal associated with resonant vibration of the motor itself and a device to which the motor is attached, wherein
   the motor has a plurality of coils that applies torque to a rotor and is arranged in a circular pattern, and
   the motor controller includes an energization control unit configured to sequentially energize the plurality of coils as follows:
      when a vibration level corresponding to the signal associated with the resonant is below a predetermined threshold, partially executing a predetermined pattern of energization steps for sequentially energizing the coils such that some but not all of the energization steps are executed in the sequence with at least one energization step in the pattern being omitted, and none of the coils are energized during an omission; and
      when the vibration level corresponding to the signal associated with the resonant vibration is above the predetermined threshold, fully executing the pattern such that all the energization steps in the pattern are executed.

8. The motor controller according to claim 7, wherein the energization control unit includes:
   a resonant vibration level storage unit that stores the predetermined vibration level; and
   a coil excitation control unit that controls energization patterns of the plurality of coils using the predetermined vibration level.

9. The motor controller according to claim 7, wherein the signal associated with the resonant vibration input to the energization control unit is input from a vibration detection sensor that is attached to the motor or the device.

* * * * *